June 3, 1969  ESTEBAN ARRIAGA LOPEZ DE VERGARA  3,447,544
PLANTS FOR THE WASHING AND DRYING OF FRUIT
Filed Dec. 19, 1967                                   Sheet 1 of 2
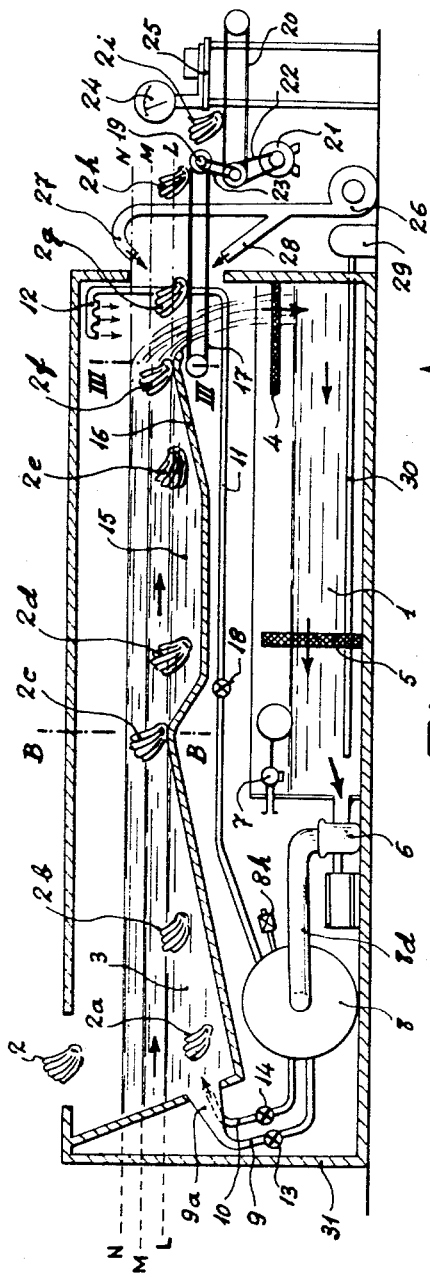
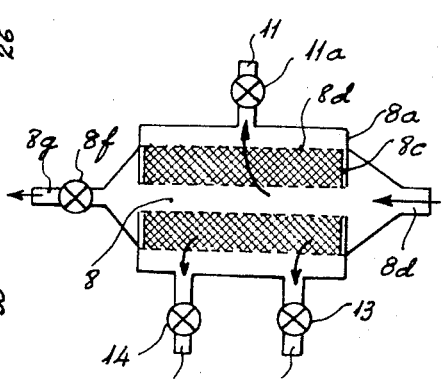
Fig. 4
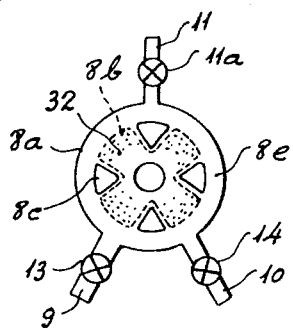
Fig. 5
INVENTOR:
ESTEBAN ARRIAGA LOPEZ DE VERGARA
BY Stephen H. Frishauf
ATTORNEY United States Patent Office 3,447,544
Patented June 3, 1969

3,447,544
PLANTS FOR THE WASHING AND DRYING
OF FRUIT
Esteban Arriaga Lopez De Vergara, Albendiego 6,
Madrid 20, Spain
Filed Dec. 19, 1967, Ser. No. 691,731
Claims priority, application Spain, Dec. 20, 1966,
334,710
Int. Cl. B08b 3/04; A23n 13/00
U.S. Cl. 134—60                                   9 Claims

ABSTRACT OF THE DISCLOSURE

Apparatus for washing and drying fruit wherein the fruit is caused to pass through a series of water baths under the influence of water pressure, then under a rinsing spray, and finally between jets of drying air. The wash water is recirculated through a horizontal and vertical filter in that order and then pumped through a final filter back to the entrance of the first water bath and admitted thereto near the bottom thereof through either or both of two separate return ducts. A third return duct carries a portion of the water to the rinsing spray.

---

The improved plant under reference consists essentially of the following elements:

A bath for washing under pressure, the longitudinal section of which is a trapezoid with the major base at the upper part, the minor base being inclined with respect to the major, forming the bottoms: one of its sides, through which the water enters, is inclined, while the other (which is open) consists of a narrows which is the spillway for the fruit, and forms what is termed the occlusion sector. The plant projection of this bath is also trapezoidal, and it tapers from the entry zone of the water and fruit as far as the occlusion sector or spillway for the fruit. The transversal section is semi-circular and its residue diminishes as the height of its bottom progressively diminishes from the point at which the fruit enters up to the point at which the fruit emerges.

A hydro-refrigeration chute of cross-section equal to the occlusion sector, the sides of which are parallel in the longitudinal section and in the horizontal projection, while the bottom descends from the said occlusion sector, becomes horizontal, and subsequently ascends to the exit spillway for the fruit.

A tank which receives the water poured off after the washing and hydro-refrigeration.

Filter grilles for the water poured off after the washing.

Filter for water under pressure.

Multiple-belt circulating for the extraction of the fruit which, having been washed, and aligned, emerges one piece after the other through the spillway.

Taps or sprays, situated above and below the multiple-belt transporter, the purpose of which is to effect the final cleaning.

Valve for regulating the pressure and the flow of water which enters the bath and reaches the taps or sprays which effect the final cleansing.

A valve for regulating the level of the water in the tank.

A valve for cleaning the pressure filter.

A motor coupled to the pump for circulating the water to be re-cycled.

A refrigerating apparatus for the water in the plant.

An external cover, suitably insulated, to avoid the loss of cold from the water which refrigerates the fruit.

Adjustments of the initial semi-circular form of the ducts through which the fruit is carried on emerging from the hydro-refrigeration chute to the shape of the fruit to be washed, in order to ensure its occlusion.

Air-blowers for drying the fruit.

An endless-belt transporter which, synchronised with the multiple-belt transporter, receives the aligned fruit with which the latter feeds it, and which carries the fruit to the weighing and packaging station or stations.

In order that the invention may be better understood, two sheets of drawings are annexed, merely by way of example, in which:

FIGURE 1 gives a schematic view of the longitudinal section of the improved plant, showing the principal elements of the said plant and illustrating an example of its operation with hands or bunches of bananas, previously out from a cluster.

FIGURE 4 represents the schematic longitudinal section of the pressure filter.

FIGURE 5 represents the cross-section of the said pressure filter.

Figures 2, 3:
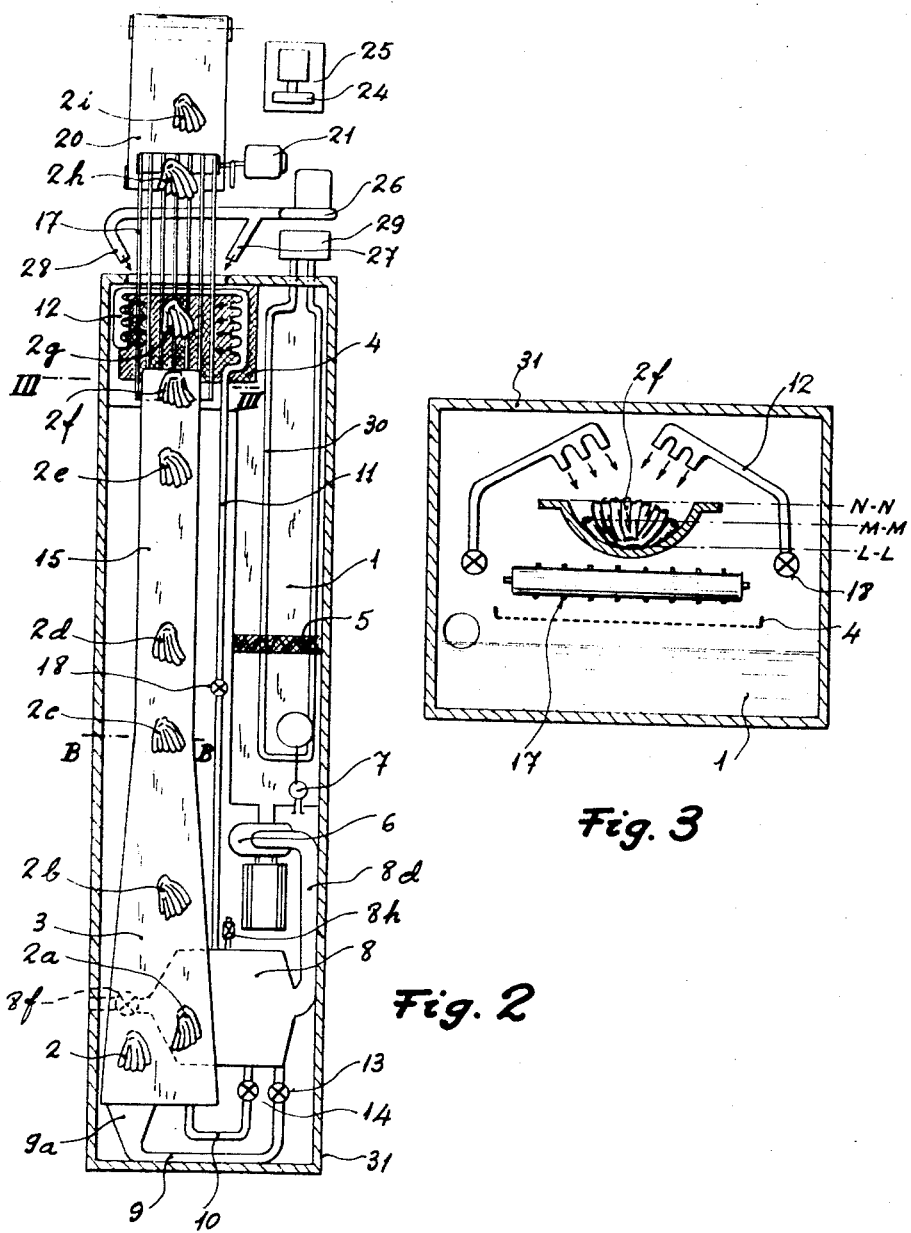
FIGURE 2 shows the plan view of the arrangement of FIGURE 1.
FIGURE 3 shows the cross-section, through III—III of FIGURES 1 and 2, coinciding with the occlusion sector of the spillway during the pasasge of a bunch of bananas.

With reference to the said figures, and in the following description, the various constituent elements and their principal parts are designated in accordance with the following nomenclature:

(1) Water tank
(2) Uncleaned fruit
(2a) Fruit in semi-flotation stage
(2b) Aligned fruit
(2c) Fruit in intermediate occlusion
(2d) Fruit in hydro-refrigeration
(2e) Refrigerated fruit
(2f) Fruit in exit occlusion
(2g) Cleaned fruit
(2h) Dried fruit
(2i) Fruit ready for packing
(3) Bath
(4) Exterior horizontal filter
(5) Interior vertical filter
(6) Re-circulating pump
(7) Water inlet valve
(8) Filter for water under pressure
(8a) External cover
(8b) Jacket of wire cloth
(8c) Triangles of the framework
(8d) Inlet duct
(8e) Annular outlet chamber
(8f) Purging valve
(8g) Evacuation duct
(8h) Safety valve
(9) Major inlet duct to the bath 3
(10) Minor inlet duct to the bath 3
(11) Duct leading to spray-taps
(12) Spray-taps
(13) Valve of the major duct 9
(14) Valve of the minor duct 10
(15) Hydro-refrigeration chute
(16) Ascendant bottom
(17) Multiple-belt transporter
(18) Valves of the spray-taps 12
(19) Common-shaft pulleys
(20) Belt transporter
(21) Electromotor
(22) Movement transmission belt
(23) Movement transmission belt
(24) Weighing station
(25) Packing table

(26) Turbo-fans
(27) Upper nozzle for air
(28) Lower nozzle for air
(29) Water refrigerator
(30) Tubular extensions of the refrigerator 29
(31) Casing
(32) Particles of dirt.

The improved plant consists of a tank 1, the upper part of which is open, part of which is arranged below the spillway to receive the water proceeding from the cleansing of the fruit 2, which cleansing is carried out in the bath 3, the water passing previously through a horizontal wire cloth filter 4 which retains the larger particles of dirt produced during the cleaning of the fruit. In the interior of the tank 1, a second vertical filter 5 is arranged, the mesh of which is finer than that of the previous filter, this latter filter being situated in front of the inlet of the re-circulation pump 6 in order to prevent the obstruction of the latter by particles of dirt of a certain size.

The filling of the tank 1 is effected by means of the inlet valve 7, which may be of any suitable type (float, electro-magnetic, etc.,) but always automatic in its operation, in order to maintain a constant level of water in the tank 1, thus ensuring the inlet current to the pump 6, the capacity and characteristics of which will be duly studied and related. The pump 6 draws in the water from the tank 1 and impels it under pressure as far as the filter 8, from which filtered water flows under pressure, on one side, to the ducts 9, 10, which carry the water to the bath 3 end, on the other side, to the duct 11, which carries the water to the spray-taps 12.

The major duct 9 begins at a by-pass valve 13 and the minor duct 10, at another valve, 14; by means these valves both the pressure and the volume of the filtered water which each of the said ducts contributes to the bath 3 are independently controlled. The difference of diameter existing between the said ducts 9 and 10, makes it possible to regulate the outflow of the water in order to give greater kinetic energy to the minor duct 10 and, consequently, to regulate the pressure of the water which incides on the fruit 2a in semi-flotation in order to align it inside the bath 3 and to place the pieces of fruit, one by one, in the spillway outlet position.

By means of the valve 13 the flow of water contributed to the bath 3 by the duct 9 is controlled; this latter duct, at its outlet 9a, progressively increases in section with the purpose of attenuating the pressure of the water flow, thus ensuring the contribution of a flow sufficient to maintain the level necessary so that on the fruit 2 falling it will not strike against the bottom.

The bath 3 reecives the uncleaned fruit 2 in its zone of greatest depth and width, submerging it until it occupies the position 2a in which, impelled by the current of water under pressure which arrives through the minor duct 10, it becomes displaced towards the sector B—B of the central spillway. The progressive tapering of the walls of the bath 3 causes the kinetic energy of the water to increase progressively, and consequently causes a progressive increase in the velocity of transportation of the fruit.

When the re-circulation pump 6 is operating, the level of the water in the bath 3 rises from the line L—L to the line M—M (FIGURE 1).

Because of the effect of the greater pressure, the velocity of the water contributed to the bath 3 by the minor duct 10 is greater, and on its being received by the fruit in the position 2a in front of the outlet, the fruit is moved towards the centre of the bath at the same time as it is impelled more rapidly, so that the pieces of fruit become aligned one after the other in their passage toward the spillway, passing to the position 2b and subsequently to the position 2c in which the effects of the narrowing of the passage, the lesser depth and the weight of the fruit itself are combined, with the result that, if the current of water is not sufficient for it to circulate normally, the occulsion of the spillway B—B is produced, and the level of the bath 3 increases up to the line N—N, so that the fruit, once more floating and impelled by the current, descends towards the hydro-refrigeration chute 15 taking up the position 2d.

In the said channel 15 the fruit is submerged in the refrigeration water, the result being that the flesh of the fruit is very rapidly penetrated by cold. Impelled by the current, the pieces of fruit move separately, aligned one after the other.

The length of the chute 15 should be directly proportional to the time necessary for the fruit to be kept in contact with the cold water in order to lower its temperature in the position 2e to the necessary degrees. For the purpose of this calculation there should also be taken into account the temperature of the refrigeration water.

The hydro-refrigeration chute 15 has at its end the ascending bottom 16 which runs as far as the outlet occlusion sector III—III, the form of which reproduces that of the spillway B—B referred to above, so that the same circumstances are created. This narowing causes the circulating water to acquire a greater kinetic energy, sufficient for the fruit 2f, in the occlusion outlet, to be able to circulate, and to be deposited on the upper section of the multiple-belt endless transporter 17.

At the valve 11a of the filter under pressure 8 there commences the duct 11 which carries filtered water under pressure to the spray-taps 12, which are situated in a plane superior to that occupied by the multiple-belt transporter 17 beneath which there are arranged the horizontal filter 4 and part of the tank 1. The volume issuing under pressure from the spray-taps 12 is controlled by means of the valve 18, which is inserted in the duct 11; in this way, and because of the spray-taps 12 being appropriately distributed in the zone a a perfect cleansing of the fruit is carried out, and the said fruit passes to occupy the position 2g, while the cleansing water from the spray-taps 12 falls into the tank 1, passing through the horizontal filter 4, together with the excess water from the bath 3.

The transporter 17 is constituted by a complex of pulleys with a common shaft 19, which pulleys operate in a parallel manner, a series of endless belts, between which there is enough separation to permit the passage of the water which is poured from the bath 3 to the tank 1. The linear velocity of the belts of the transporter under reference must be equal to that of the belt of a second transporter 20 which is arranged immeriately following on and beneath the first-named transporter, and is driven by an electromotor 21 which also transmits its movement to the pulleys 19 through the system of endless belts 22, 23. In the manner the necessary synchronization of the speeds of both transporters is achieved so that the fruit may pass from the position 2h, in which it has been dried, to the position 21, in front of the weighing station 24 and the packing station on the table 25. These stations are arranged in a suitable number on both sides of the transporter belt 20, the length of which is variable.

The turbo-fans 26 provide a volume of air under pressure sufficient to act on the drops of water retained on the surface of the fruit situated in the position 2g from two different directions.

This effect is produced by means of the upper nozzle 27 which blows from one side in an oblique direction, both the nozzles being oriented in a direction contrary to that of the circulation of the fruit so that the water given off is caused to retrocede (with respect to the fruit in circulation) and is directed towards the tank 1 for the purpose of recuperation and recycling.

The refrigerator 29 by means of the ducts 30 extended in the interior of the tank 1, generates the degree of cold necessary to cool the water which recirculates through the said tank.

The complex of the installation is suitably covered by a housing 31 which includes a layer of insulating material which prevents the loss of cold and constitutes a thermal insulation which envelops all the water in circulation, leaving only two apertures, one for the introduction of unwashed fruit 2, and the other for the emergence of the dried fruit 2h: this latter aperture permits the passage of a multiple-belt transporter sector 17.

The pressure filter 8, represented schematically in FIGURES 4 and 5, is formed with an outer cover 8a which envelops and interior jacket 8b of wire cloth, which forms the filtering surface and which is arranged to follow a broken contour supported on the triangles 8c, with the object of increasing the filtering surface. The dirty water enters through the duct 8d, impelled under pressure by the recirculation pump 6, and the particles of dirt 32 are retained in the interior of the jacket 8b, while the clean water passes to the annular chamber 8e, from which it emerges through the ducts 9, 10, 11, when the corresponding valves, 13, 14, 11a are open, and the purging valve 8f is kept closed. This situation of the valve must be reversed in order to effect the interior cleansing of the filter 8, in which case the valves 13, 14, and 11a, are closed, and the purging valve 8f is opened, after which the pump 6 is started up and the water under pressure, which has an ample entrance through the duct 8d, cleanses the interior of the wire cloth jacket 8b, carrying off the particles of dirt 32 through the central passage of the apparatus to the evacuation duct 8g, placed in service by the said purging valve 8f.

The outer housing 8a includes a safety valve 8h which prevents damage being caused by an excess of interior pressure. The support 8c of the wire cloth jacket 8b makes a close fit with the exterior housing 8a in such a manner that only filtered water can reach the annular chamber 8e.

The recycling of the water from the tank 1 continuously carries out in the operation of cleansing the fruit with clean water, to which additives may be added: the quantity should be determined in accordance with the volume of water in circulation, and the additives should be gradually replaced in accordance with natural losses produced in the installation by evaporation or other causes.

Provision has been made for the case in which the operation of washing is carried out on fruits whose treatment and packaging do not require refrigeration. In this case, the hydro-refrigeration zone may be eliminated, or the operation of the refrigerator 29 may be stopped; again, the chute 15 may be replaced by a descending ramp from which the transporters 17 and 20 pick up the fruit.

I claim:

1. Apparatus for the washing and drying of fruit comprising an open-top tank, part of which is arranged below a spillway to receive the water proceeding from the cleansing of the fruit, which is carried out in a bath; the water previously passes through a horizontal wire-cloth filter which retains the largest particles of dirt produced in the washing by immersion; in the interior of the above-mentioned tank, there is a second filter, the mesh of which is finer than that of the first-named filter above, situated vertically and in front of the inlet of a recirculation pump which draws in the water contained in the tank which is kept at the constant level by means of a float-valve means which functions automatically; the pump impels the water under pressure to a filter from which it emerges completely clean, through two ducts, a major and a minor, each of which is equipped with a valve for the regulation of the issuing pressure; these ducts carry the water to the bath, and a third duct, also equipped with a control valve, carries the water to spray-taps, which complete the cleansing of the fruit already water-washed under pressure.

2. Apparatus for the washing and drying of fruit, in accordance with claim 1, characterized by the fact that the major and minor ducts which transport the clean filtered water to the bath are of different diameters, a fact which makes it possible to regulate the outflowing pressure, giving greater kinetic energy to the water proceeding from the minor duct, and consequently making it possible to control pressure of the water which incides on the recently introduced fruit, in a state of semi-flotation, in order to align the pieces of fruit in the interior of the bath and to place them, one by one, in position to emerge through the spillway, while, on the other hand, the mouth of the major duct progressively increases its section with the object of attenuating the pressure of the flow of water, while at the same time, it ensures the contribution of a volume sufficient to maintain the level necessary so that the fruit which is introduced, on its falling, does not strike against the bottom of the bath.

3. Apparatus for the washing and drying of fruit, in accordance with the claim 1, wherein the bath comprises a longitudinal section of trapezoidal shape the major base of which is in the upper part, the minor base forming the bottom and being inclined with respect to the upper part, one of the sides of the said trapezoid through which the water enters being inclined, while the other which is opened consists of a narrows which is the spillway for the fruit and forms what is termed the occlusion sector; the plan projection of the said bath is also trapezoidal, tapering from the zone where the water and fruit enter to the occlusion sector or spillway for the said water and fruit; following this latter sector, a descending ramp leads to the bottom of a hydro-refrigeration chute whose lateral walls are parallel and maintain the separation that they had in the above-mentioned spillway so as to maintain the fruit aligned one after the other the said chute has, at its end, the bottom rising towards a second occlusion sector, for the emergence of the already washed fruit and the excess water from this operation in which the forms of the first spillway are reproduced.

4. Apparatus for the washing and drying of fruit, in accordance with claim 1, characterized by the fact that the pressure filter is equipped with a valve at which there commences a duct which carries the filtered water to the spray-taps, these latter being situated in a plane superior to that occupied by a transporter constituted by a plurality of endless belts, arranged in parallel on pulleys of the same diameter, driven by a common shaft, beneath which transporter there are suituated the horizontal filter and part of the tank which connects the washing water, so that the cleansing water from the spray-taps falls into the tank passing through the horizontal filter, together with the excess water from the both.

5. Apparatus for the washing and drying of fruit, in accordance with claim 4, which are characterized by the fact that the linear velocity of the plurality of endless belts of the transporter is equal to that of the belt of a second transporter which is arranged following on and immediately below the first-named transporters and is driven by an electro-motor which drives, jointly and synchronously, the two said transporters the latter of which receives the fruit, now cleaned and dried, and carries it to the weighing and packing stations which are arranged on both sides of its single endless belt.

6. Apparatus for the washing and drying of fruit, in accordance with claim 1, characterized by the fact that the fruit, once it has been washed by immersion in the bath, and by forced spring in the spray-tap zone, receives the action of a drying device which employs air under pressure produced by suitable turbo-fans, which air acts on the drops of water retained on the surface of the fruit from two different directions, by means of upper nozzles through which air is blown from the sides in an oblique downward direction, and from lower nozzles through which air is blown from the opposite side in an oblique upwards direction, these nozzles coinciding in their orientation contrary to the direction of the circuiation of the fruit, now situated on the first sector of the multiple-belt transporter, so that the water given off is caused to recede with respect to the fruit in the circulation and is directed toward the tank, for the purposes of recuperation and recycling.

7. Apparatus for the washing and drying of fruit, in accordance with claim 1, characterized by the fact that they include a refrigerating element, which, by means of extensions which are prolonged in the interior of the tank and below the level of the water contained therein, generates the necessary degree of cold to cool the water which is recirculated through the said tank, the complex of the plant being covered by a housing which includes a layer of insulating material which prevents the loss of the said degrees of cold, and which constitutes a thermal insulation which envelope the whole of the water in circulation, leaving only two apertures for the introduction of the unwashed fruit and for the emergence of the cleaned and dried fruit, respectively, this latter aperture permitting the passage of a sector of the multi-belt transporter which carries the fruit to the exterior.

8. Apparatus for washing and drying of fruit, in accordance with claim 1, characterized by the fact that the pressure filter is constituted by an exterior cover which envelops an interior wire cloth jacket, which forms the filtering surface, and which is arranged so as to follow the broken contour of a support which includes some triangles so that the said filtering surface may be increased; in the meshes of the said filter there are retained the particles of dirt carried by the water under pressure, which water, proceeding from the re-circulating pump, has an inlet through the central one of the bases of the cover, while the clean water passes to the annular chamber resulting between the said cover and the mesh jacket, from which chamber it emerges through the valves which mark the starting points of the major and the minor ducts which carry the water under pressure to the bath, and of the duct which carries the water to the spray-taps in order that it may effect the final cleansing, provided that a purging valve arranged in the base opposite to that of the inlet is closed; the said base givest access to the duct for evacuating the residues, utilizable for the interior cleansing of the filter under pressure, upon the natural outlet valves, mentioned above, being previously closed.

9. Apparatus for the washing and drying of fruit, in accordance with the foregoing claim 1, characterized by the fact that the exterior housing of the pressure filter includes a safety valve which prevents damage due to an excess of interior pressure, at the same time as the support of the wire-cloth jacket makes a close fit against the said cover in such a manner that only clean filtered water can reach the annular chamber from which there originate the outlets for the service of washing and cleansing.

References Cited

UNITED STATES PATENTS

| | | | |
|---|---|---|---|
| 1,931,463 | 10/1933 | Brogden | 134—68 |
| 2,015,512 | 9/1935 | Brogden et al. | 134—68 |
| 2,697,050 | 12/1954 | Barnes | 134—60 XR |
| 3,277,907 | 10/1966 | Goldman | 134—111 XR |

FOREIGN PATENTS 1,075,273  10/1954  France.

ROBERT L. BLEUTGE, *Primary Examiner.*

U.S. Cl. X.R.

134—68, 111; 99—239; 15—3.15